(12) United States Patent
Caron et al.

(10) Patent No.: US 6,751,387 B2
(45) Date of Patent: Jun. 15, 2004

(54) MICROPOROUS GLASS WAVEGUIDES DOPED WITH SELECTED MATERIALS

(75) Inventors: Serge Caron, Saint-Augustine-de-Desmaures (CA); Yves Taillon, Saint-Augustin-de-Desmaures (CA)

(73) Assignee: Institut National D'Optique, Quebec (CA)

( * ) Notice: Subject to any disclaimer, the term of this patent is extended or adjusted under 35 U.S.C. 154(b) by 40 days.

(21) Appl. No.: 10/092,164

(22) Filed: Mar. 5, 2002

(65) Prior Publication Data

US 2003/0169985 A1 Sep. 11, 2003

(51) Int. Cl.$^7$ .................................. G02B 6/02
(52) U.S. Cl. .................. 385/123; 385/37; 385/142; 65/31
(58) Field of Search ............... 385/12, 37, 49, 385/123, 129, 130, 142; 65/31, 378, 390

(56) References Cited

U.S. PATENT DOCUMENTS

| | | | |
|---|---|---|---|
| 2,106,744 A | 2/1938 | Hood et al. | 106/36.1 |
| 3,938,974 A | 2/1976 | Macedo et al. | 65/3 R |
| 5,250,095 A | * 10/1993 | Sigel et al. | 385/12 X |
| 5,367,588 A | 11/1994 | Hill et al. | 385/37 |
| 5,585,640 A | 12/1996 | Huston et al. | 250/483.1 |
| 5,729,641 A | 3/1998 | Chandonnet et al. | 385/2 |
| 6,075,915 A | 6/2000 | Koops et al. | 385/125 |

FOREIGN PATENT DOCUMENTS

| | | |
|---|---|---|
| EP | 0762179 | 3/1997 |
| WO | WO 0196919 | 12/2001 |

OTHER PUBLICATIONS

"Formation of Bragg Gratings in Optical Fibers"; by G. Metz, W. W. Morey, and W. H. Glenn; Optics Letters; Aug. 1, 1989, vol. 14, No. 15, p. 823–825.

"Composite Material Based on a Polymer and a Porous Glass for Fabricating Laser Components"; by S. M. Dolotov, M. F. Koldunov, A. A. Manenkov, G. P. Roskova, N. M. Sitnikov, N.E. Khaplanova, and T. S. Tsekhomskaya; Sov. J. Quantum Electron., 22 (11), Nov. 1992, p. 1060–1061.

"Optical Composites Based on Porous Silica Glasses"; by N. S. Shelechov; Optica Applicata, vol. XXIV, No. 1–2, 1994; p. 27–35.

"Photopolymer–Filled Nanoporous Glass as a Dimensionally Stable Holographic Recording Medium"; by Melinda G. Schnoes, Lisa Dhar, Marcia L. Schilling, Sanjay S. Patel and Pierre Wiltzius; Optical Letters, vol. 24, No. 10, May 15, 1999; p. 658–660.

"Electrically Tunable Efficient Broad–Band Fiber Filter"; by Anatoli A. Abramov, Benjamin J. Eggleton, John A. Rogers, Rolando P. Espindola, Arturo Hale, Robert S. Windeler and Thomas A. Strasser: IEEE Electronics Technology Letters, vol. 11, No. 4, Apr. 1999; p. 445–447.

* cited by examiner

Primary Examiner—Phan T. H. Palmer
(74) Attorney, Agent, or Firm—Merchant & Gould, P.C.

(57) ABSTRACT

The present invention concerns waveguides made from porous glass which have been doped with certain selected materials which exhibit optical properties. In the context of the invention, the selected materials are optical materials which exhibit optical activity or a Faraday effect, such as an electro-optic material, and more specifically a polymer. Devices made according to the present invention can be used as phase modulators.

11 Claims, 7 Drawing Sheets

MICROPOROUS GLASS WAVEGUIDES DOPED WITH SELECTED MATERIALS

FIELD OF THE INVENTION

The present invention relates to microporous glass waveguides doped with selected materials, and more particularly to such glass waveguides for fibre optic applications.

DESCRIPTION OF THE PRIOR ART

Many different devices have been proposed to control the property of light in optical materials, such as the polarization state, the phase or the intensity, particularly for application in optical fibre telecommunications. Among these different devices, a class of them use the property that electro-optic materials have to change the index of refraction upon application of an electric field. These latter devices are based on the principle of controlling the phase of the light travelling through the device, and have many applications. For example, in a Mach-Zender type interferometer configuration, the power transmitted can be controlled by modulating the phase of the light travelling in one of the arms of the interferometer.

To the inventors' knowledge, devices using electro-optic materials are limited to planar waveguides, which poses two fundamental problems when trying to couple them to optical fibres. First, the index profile of a planar waveguide does not possess the circular symmetry of an optical fibre index profile, which results in coupling losses between the two waveguides, as well as a polarization dependence on the transmission properties. Secondly, the planar and voluminous structure of a planar waveguide does not permit an easy alignment of the core of the planar waveguide with the core of the optical fibre, increasing the costs. One could also add that in some cases, the index of refraction of the planar waveguide is considerably greater than that of the optical fibre, which causes problems due to Fresnel reflections. This is particularly true with planar waveguides inscribed in lithium niobate, whose index is 2.12, compared to 1.45 for silica.

On the other hand, two optical fibres can be very precisely aligned by using inexpensive connectors, or by splicing two fibres with a splicer, the cost of which is quickly amortized. Furthermore, aligning two optical fibres does not cause Fresnel reflections.

Other than electro-optic phase modulators, two devices, among others, which find particular application in the field of telecommunications are polarizers and Bragg gratings. Existing polarizers are limited to single mode waveguides and Bragg gratings present limited diffraction efficiencies. These limits are related to the manufacturing process or to the material used for the manufacture of waveguides, i.e. silica in the case of optical fibres.

Other materials, such as polymers, have advantages over silica, such as optical activity, induced dichroism and a high diffraction efficiency. It would thus be useful to incorporate such materials into optical fibers.

Finally, another device which finds particular use in the telecommunications field is an optical isolator, of which one of the components is a Faraday rotator. These devices work in a magnetic field created by a magnet, and it would be useful to insert the magnet and materials exhibiting a high Faraday effect into the waveguides themselves.

SUMMARY OF THE INVENTION

It is thus an object of the present invention to provide a porous waveguide including a material which exhibits optical properties. In accordance with the invention, this object is achieved with an optical waveguide made of porous glass, wherein at least a portion of the pores of the porous glass are filled with an optical material.

In accordance with another aspect of the invention, there is provided an optical waveguide apparatus comprising: an optical waveguide made of porous glass, where the pores of the porous glass are filled with an optical material; and a pair of electrodes on opposed sides of the optical waveguide in order to induce a change in the index of refraction of the optical waveguide upon application of an electric field between the electrodes.

In an advantageous aspect of the invention, the optical material is a polymer or other type of material exhibiting electro-optical properties.

The devices according to the present invention can be used as phase modulators.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

In order to properly situate the present invention, it is important to define what is meant in the present description by "porous glass", or "microporous glass" or "porous silica". These expressions, which can be used interchangeably, designate a glass, which is generally silica-based, containing a myriad of small, interconnected holes.

These holes are called pores or micropores, and their size is almost always less than 10 nm. The holes are obtained in the glass by performing a chemical attack of a boron-silica glass, where the boron and alkaline constituents have been separated from the silica by a high temperature separation of phase and then placed in a solution by chemical attack, leaving a skeleton full of holes.

This type of porous glass must not be confused with porous soot, consisting of microparticles of silica and which is obtained by combustion of silicon tetrachloride. This agglomerate is often called, in the literature, porous glass, but it is not the same porous glass as used in the present description. The porous glass used in the present description is made differently, and the structure and porous properties are completely different. Finally, "porous glass" as used in the present description should not be confused with permeable compounds such as polymer membranes, which are also called porous but do not contain pores or holes. In the latter case, porous refers to its chemical property, rather than to its structure, as in the present description.

In its broadest statement, the present invention concerns an optical waveguide made of porous glass, where at least a portion of the pores of the waveguide, either in the core or in the cladding, or both, are filled with a material which affects the propagation of light within the waveguide. The material which affects the propagation of light is preferably a material which exhibits optical activity, such as an electro-optic polymer, dichroism or a high Faraday effect.

A variety of different embodiments will be described hereinafter.

Electro-Optical Fibre

Figure 1A:
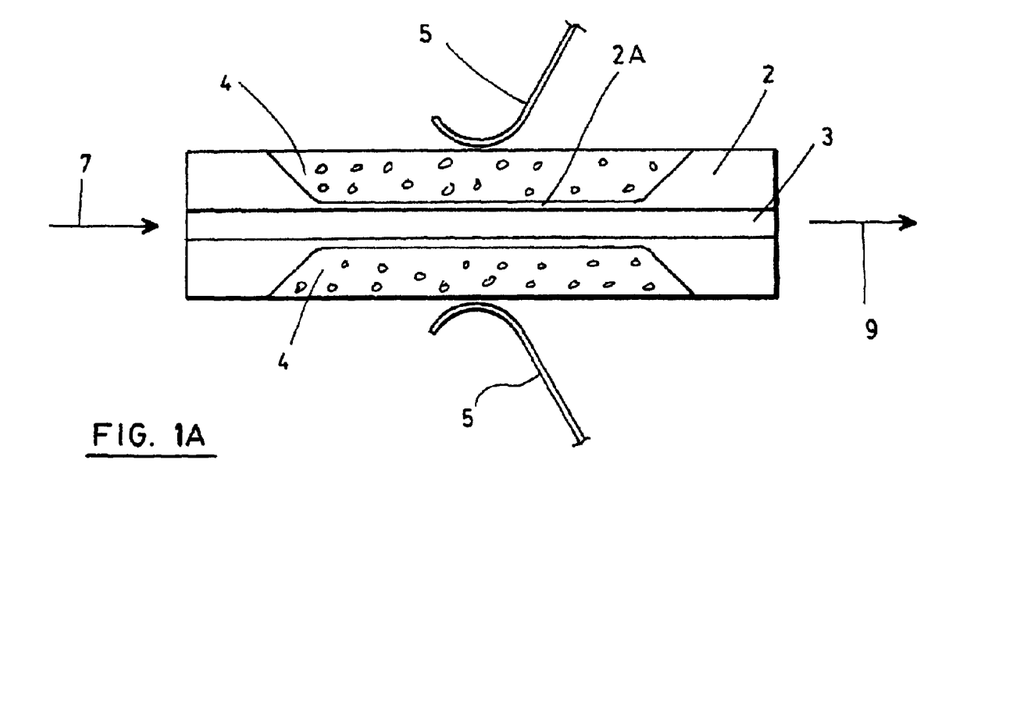
FIGS. 1A and 1B are side views of an optical fibre made from porous glass according to a preferred embodiment of the invention, including a pair of electrodes.
Figure 1B:
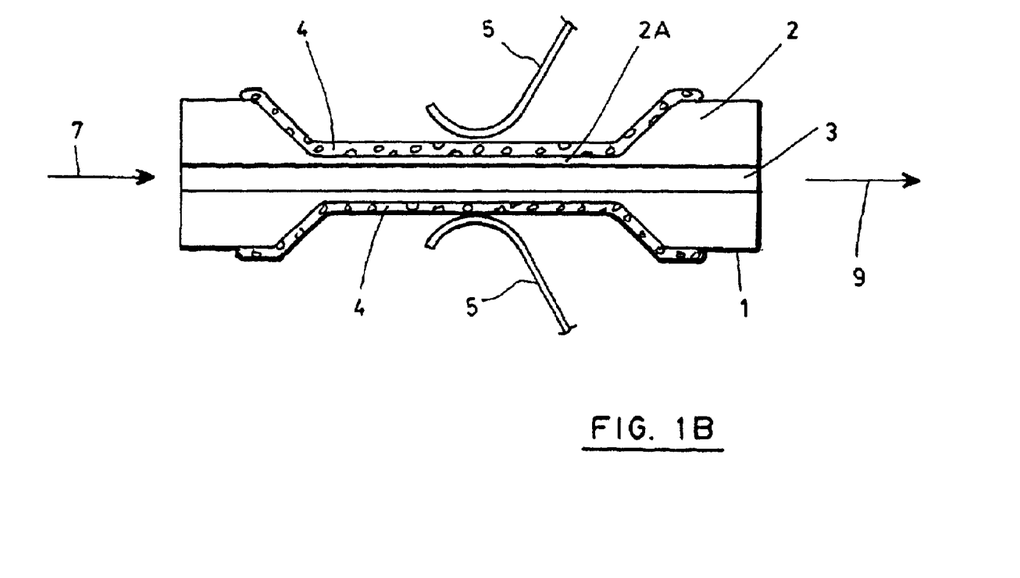
Figure 1C:
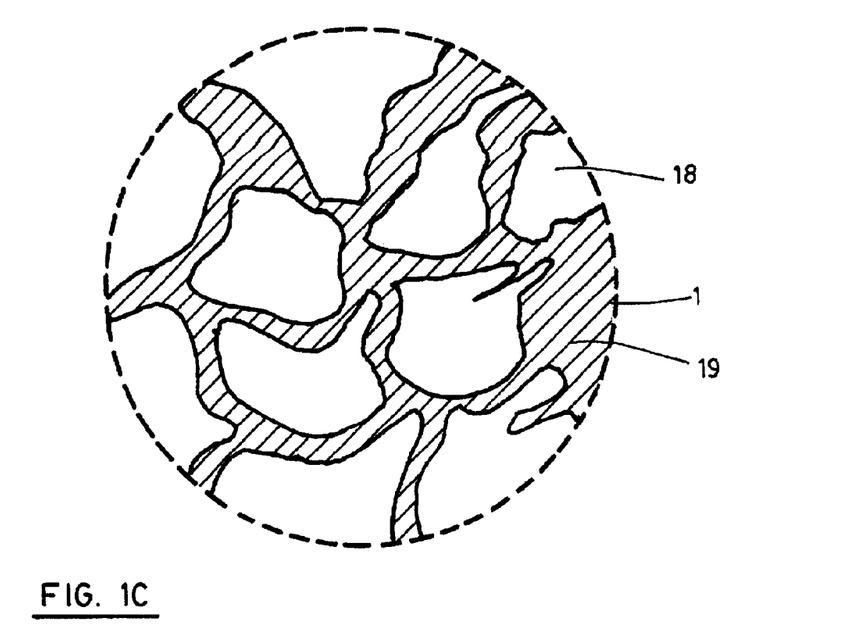
FIG. 1C is an enlarged view of the silica skeleton and the pores of the waveguide being filled with an electro-optical polymer.

Referring now to FIG. 1A, there is shown a composite electro-optical fibre in its simplest form (the drawing is clearly not to scale, and the proportions are exaggerated). FIG. 1C shows the microscopic structure of the composite material. The fibre 1 is made from a microporous glass 18 formed of a skeleton of silica, preferably doped silica, containing a myriad of small, interconnected holes or pores. The holes have been at least partially filled with an electro-optical material 19, preferably a polymer, whose chains have been oriented in a predetermined orientation by an electric field. The polymer is chosen according to its preferably high electro-optical coefficient, and also according to its index of refraction, which is ideally substantially equal to that of the silica skeleton. Consequently, components 18 and 19 ideally have the same index of refraction.

In order for the fibre to guide light, there must be a mismatch of the index of refraction between the core 3 (where the light is guided) and the cladding 2. The index of refraction of the cladding must be less than the index of refraction of the core.

The skeleton structure of the silica 18 in the core 3 can be doped with a chemical compound which increases the index of refraction of the core 3. Thus, a slight mismatch between the index of refraction of the silica structure 18 and the polymer 19 occurs, either in the cladding if the index of refraction of the porous structure 18 and the polymer 19 are equal in the core, or in the core 3 if the index of refraction of the porous structure 18 and the polymer 19 are equal in the cladding. This produces some guiding losses due to diffusion, but the level of losses is very low. It should be noted that if the fibre is to be doped with a polymer which has an index of refraction different from silica, one can force a difference in the index of refraction between the cladding and the core by creating a difference of porosity between the cladding and the core in the porous waveguide before doping.

The size of the core 3 and the numerical aperture of the fibre determines whether the fibre will support single mode or multimode transmission of light at a given wavelength.

Figure 1D:
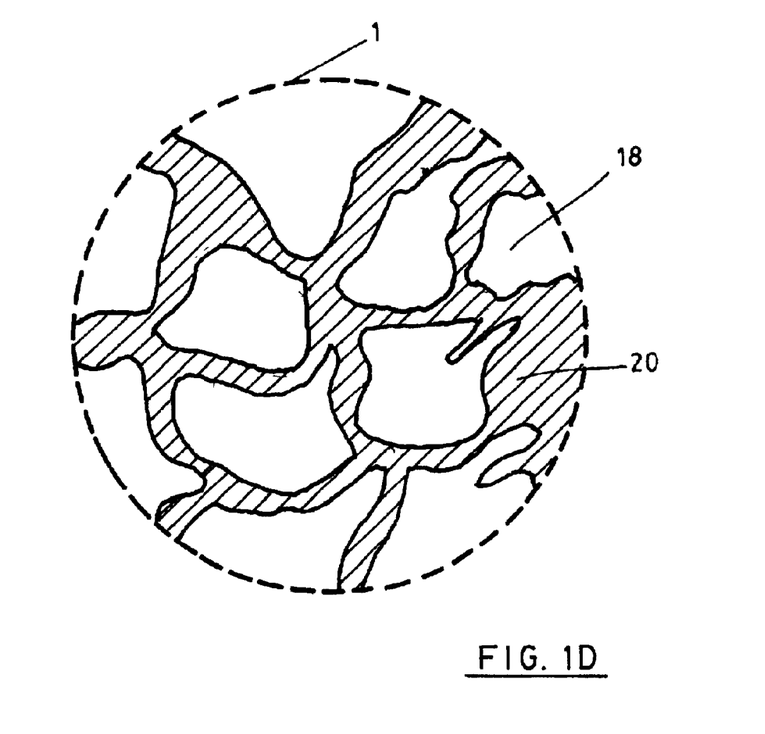
FIG. 1D is an enlarged view similar to FIG. 1C, where the pores are filled with a metal.
Figure 1E:
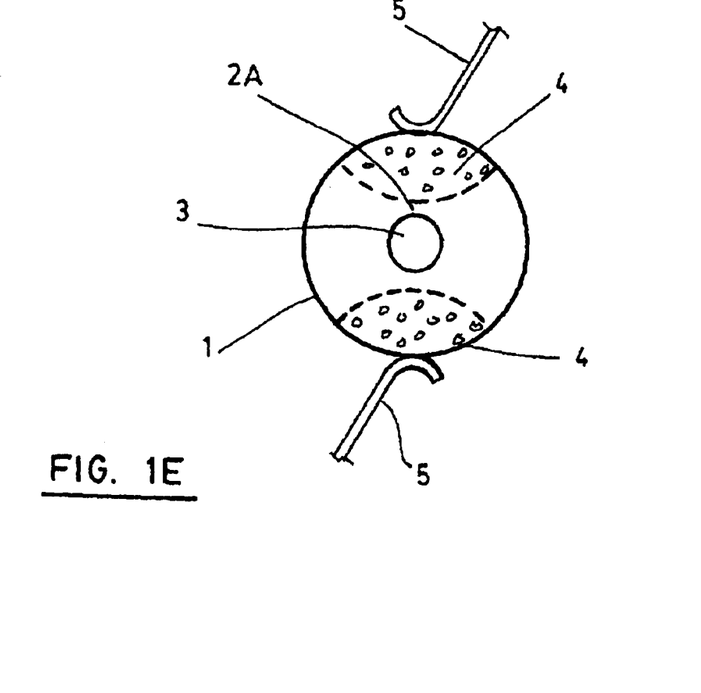
FIG. 1E is a cross-sectional view of the fibre of FIG. 1A.

The electro-optical fibre 1 is also provided with two electrodes 4 on either side of the core 3 and connected to an external electrical circuit by two conductors 5. The electrodes can be fabricated by directly depositing in the pores of the silica 18 a metal such as silver or gold, shown in FIG. 1D, through an electroless plating process. The resulting device is shown in FIG. 1A.

The electrodes can also be made by mechanically polishing or chemically attacking the cladding to remove the cladding adjacent the core, and then, by evaporation, deposit the metal on the core. This is shown in FIG. 1B.

It is an important consideration that the electrodes 4 be sufficiently removed from the core 3 so that the evanescent wave travelling in the cladding not be attenuated by the electrodes 4, but close enough to the core 3, so that the electric field be as high as possible within the core when a voltage is applied to the electrodes.

As mentioned previously, a voltage applied to the electrodes creates an electric field, which, by an electro-optic effect, changes the index of refraction in the core of the fibre and the portion of the cladding 2a between the core 3 and the electrodes 4. This change in the index of refraction is used to change the phase of the light, so that the phase of the light at the output of the fibre can be modulated by applying a voltage between the electrodes 4.

Although the present description has been made with respect to an optical fibre, it should be understood that it is equally applicable to other waveguides, such as planar waveguides, provided that it is a combination of porous glass and an electro-optical material, such as a polymer.

Figure 2:
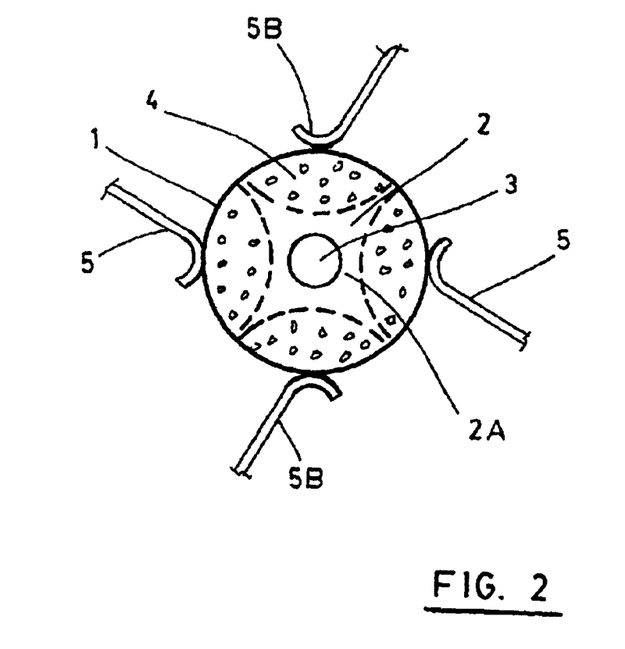
FIG. 2 is an alternative embodiment of FIG. 1A, where the fibre includes two pairs of electrodes.

Alternatively, the electro-optical fibre can be provided with four electrodes, or two pairs of electrodes 5A and 5B. The application of two perpendicular electric fields can help eliminate the birefringence induced by a single electric field and thus permits the electro-optical device to be insensitive to the polarisation of the injected light.

Figure 5:
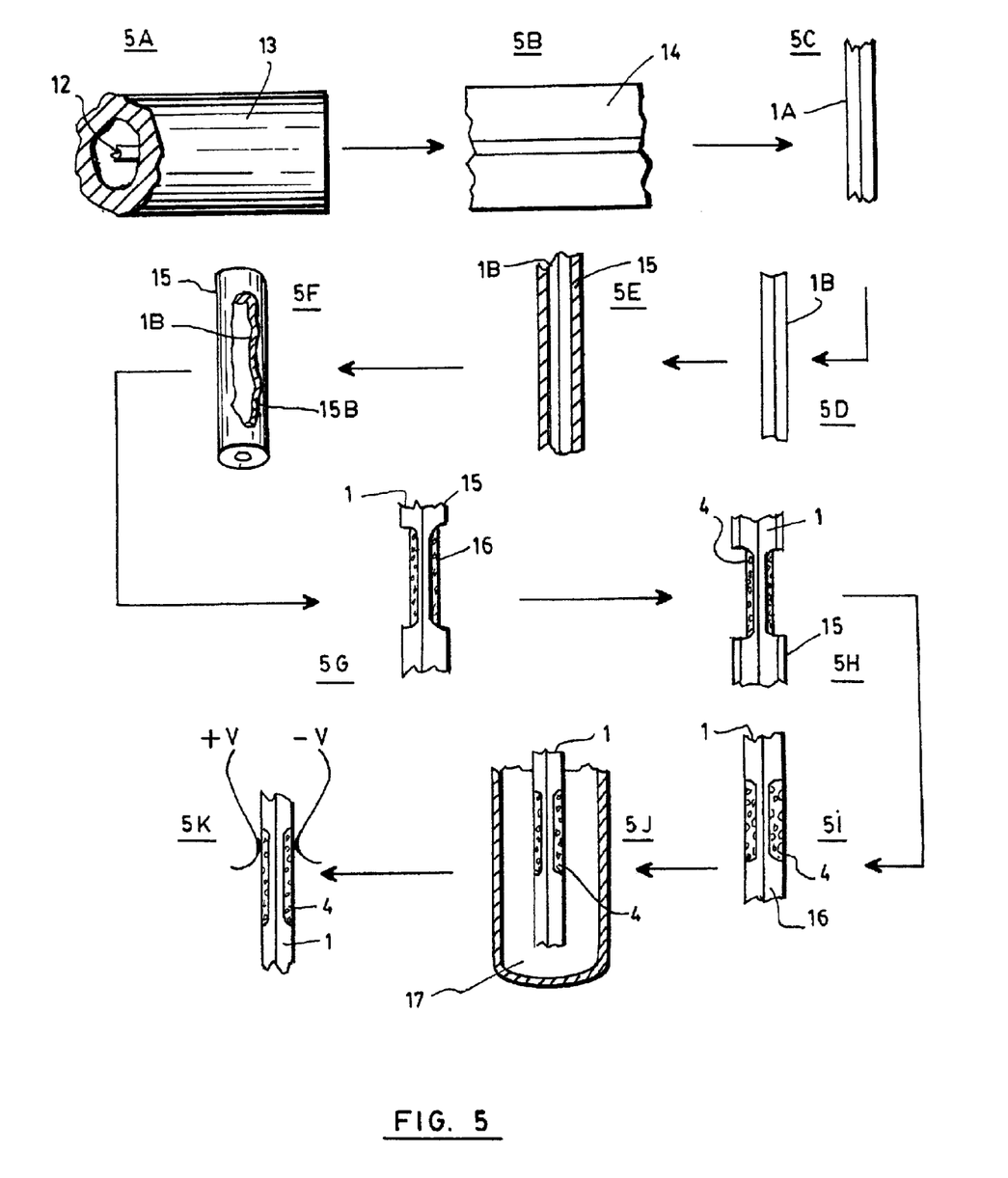
FIGS. 5A–5K are schematic representations of a method of making an electro-optic fibre according to a preferred embodiment of the invention.

An illustrative method for obtaining an electro-optical fibre according to a preferred embodiment of the invention is illustrated in FIG. 5. It should be noted that the basic method is applicable to all fibres described herein. Consequently, when describing the methods for the other fibres, only the different steps will be outlined.

An optical fibre preform is made with a tube of borosilica glass, which is redrawn on a rod of borosilica glass containing aluminium oxyde (or another dopant), in order to increase the index of refraction (5A). The composition of these glasses is selected so that they present a separation of phase of the boron oxides and alkalines at a high temperature. The preform is drawn into an optical fibre (5B), and cut in sections (5C). A section of the fibre undergoes a treatment at a temperature of approximately 500° C. in order to induce the separation of phase (5D). The section of the fibre having undergone this treatment is allowed to cool, and, by standard microlithography processes, is covered with a photoresin (5E) so that two opposite portions of the fibre can be subjected to an acid attack (5F).

By controlling the time the fibre is exposed to the attack, only the cladding can be made porous (5G). The glass is then rinsed and dried. At this point, a metallic deposit can be inserted into the pores by the electroless plating method in order to form the electrodes (5H). Alternatively, the porous section of the fibre can be submitted to an NaOH attack and metallised by vaporisation. Whatever the method used, conductors are then soldered to the electrodes (5H).

The photoresin is removed by known methods. The fibre is then subjected to a new chemical attack to render it completely porous (5I). The fibre is then impregnated with monomers and/or oligomers in order to make the polymer in the pores (5J). The monomers and/or oligomers are then polymerised in the presence of an electrical field by thermal or photochemical means (5K).

It should be noted that the application of the magnetic field which serves to permanently orient the polymer in order to render it electro-optical, can be done after the polymerisation, by heating the polymer above its vitrous transition temperature, and then applying the field.

Another alternative is to proceed as above, but leaving the extremities of the fibre non-porous until the polymerisation and orientation steps. Then, the extremities can be made porous and impregnated with a sol-gel, or any other mineralising substance to promote the fusion of the fibre with standard telecommunications fibres.

Optical Fibre with Bragg Grating

Figure 3A:
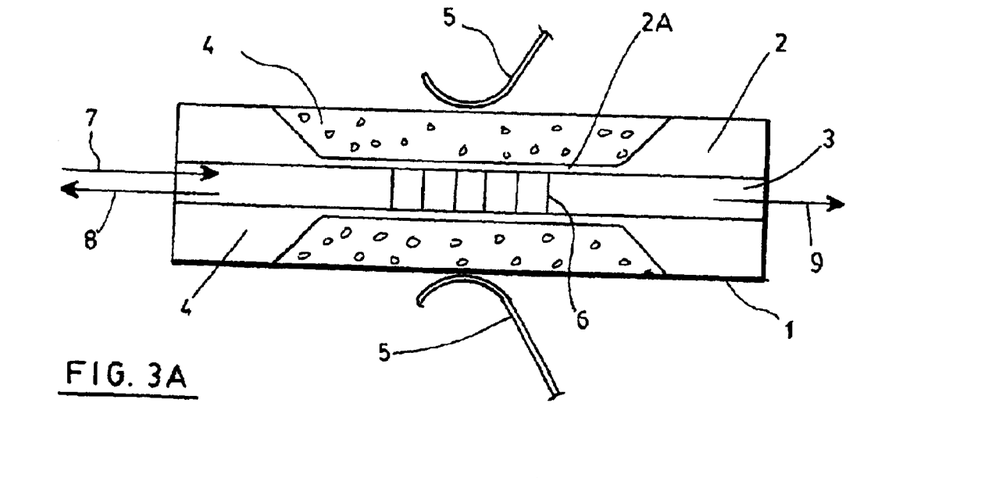
FIG. 3A is a side view of an optical fibre according to yet another embodiment of the invention, including an unslanted Bragg grating.
Figure 3B:
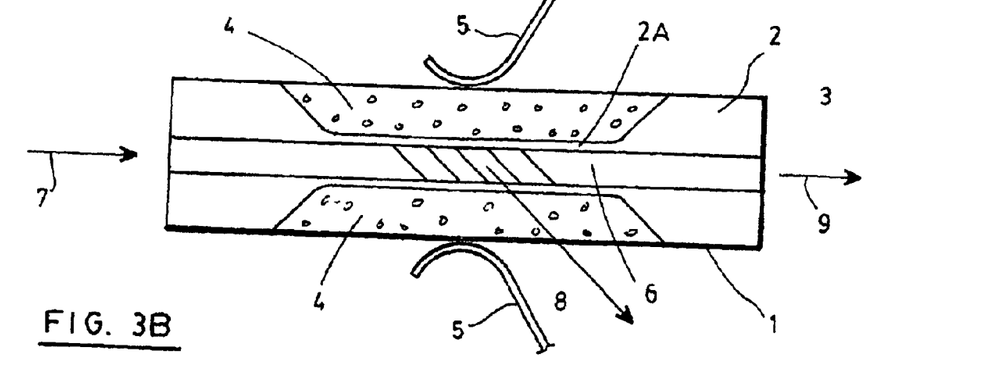
FIG. 3B is a side view similar to FIG. 3A, including a slanted Bragg grating.
Figure 3C:
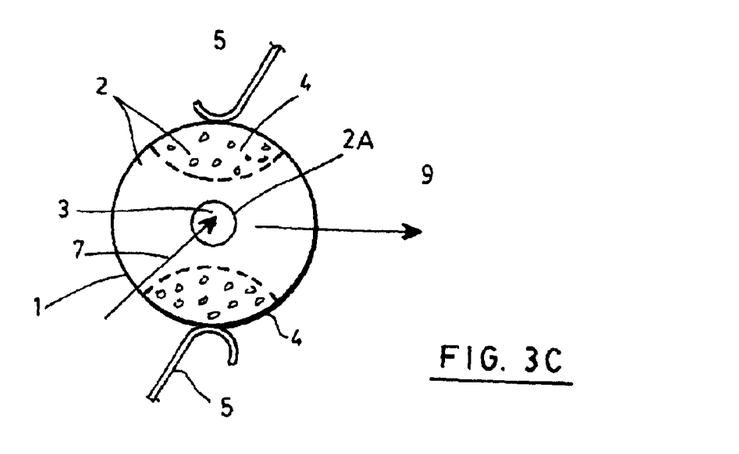
FIG. 3C is a cross-sectional view of the fibre of FIG. 3B.

Referring now to FIG. 3A, there is shown an optical fibre made of porous glass, where the pores of the glass have been filled with a material which affects the propagation of light within the fibre. The optical fibre further includes an unslanted Bragg grating. The fibre of FIG. 3A may also be provided with electrodes 5, although it is not a requirement of the invention.

In a preferred embodiment of the invention, the pores have been filled with a polymer, and the Bragg grating is created within the polymer.

Two illustrative ways of forming the Bragg grating are described herein, but it should be understood that any other method is equally applicable for the purposes of the invention.

Firstly, the Bragg grating can be formed by photobleaching of a dye in the polymer, which can be oriented or not. It is well known that a majority of electro-optical polymers contain dyes, and it is this dye which creates the electro-optical effect. The local destruction of these dyes by photobleaching, by using standard Bragg grating writing techniques, allows the periodical modulation of the electro-optical effect and to create a Bragg grating which can be electrically modulated through the electro-optical effect, where the optical fibre is also provided with electrodes.

Secondly, the Bragg grating can be formed by the photopolymerization of a polymer, by illuminating it with a periodic pattern. The application of an electric field during the process of photopolymerization conserves the electro-optical effect.

The writing of the Bragg grating in the photopolymer can be done by illuminating the sides of the impregnated fibre or by holography. In the last case, by interfering two beams travelling in the core of the fibre in opposite directions, the photopolymerization permits the writing of the grating. One can use both one photon or two photon holography. It should also be noted that by using this technique, slanted gratings can be written, which allows the injection of light from the side. Such a device is useful for optical fibre lasers.

As mentioned above, the fibre is made according to the previous description, but the monomers and/or oligomers contain an electro-optical dye. A substance permitting the photobleaching of the dye at a wavelength other than that at which the device will be used can also be added.

Waveguides Exhibiting Optical Activity and Polarizationselectiveness

Figure 4A:
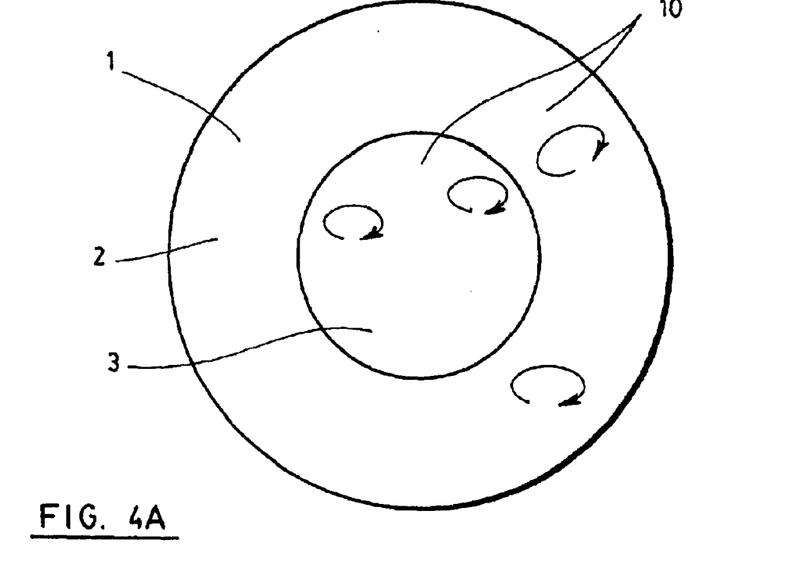
FIG. 4A is a cross-sectional view of a fibre according to another embodiment of the invention, where the pores are filled with a material exhibiting optical activity, illustrated by the clockwise arrows.
Figure 4B:
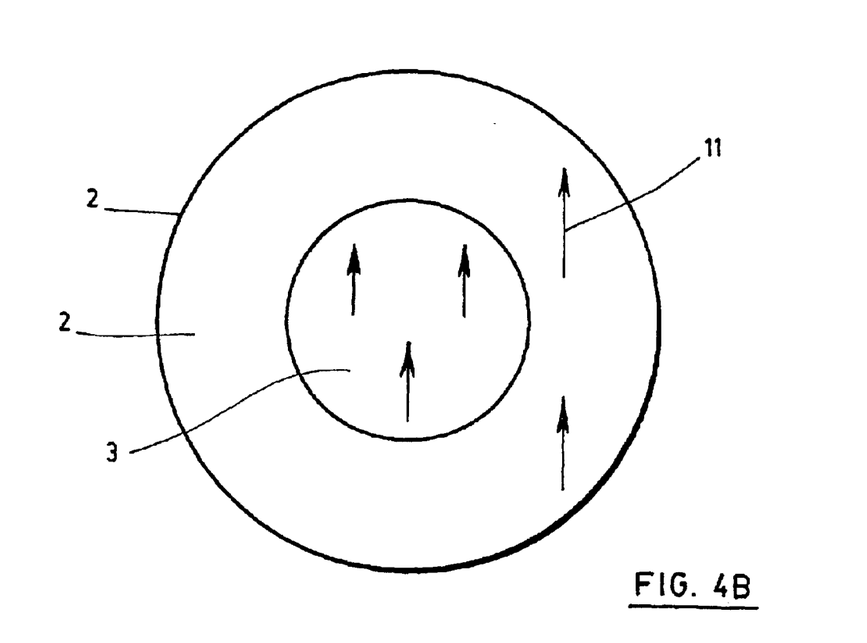
FIG. 4B is a cross-sectional view of a fibre according to another embodiment of the invention, where the pores are filled with a material exhibiting dichroism.

The present invention also contemplates optical waveguides made from porous glass, where the pores of the glass have been filled with a material which exhibits optical activity (which is also denoted circular birefringence) or dichroism. Such waveguides are illustrated in FIGS. 4A and 4B, respectively.

Figure 4C:
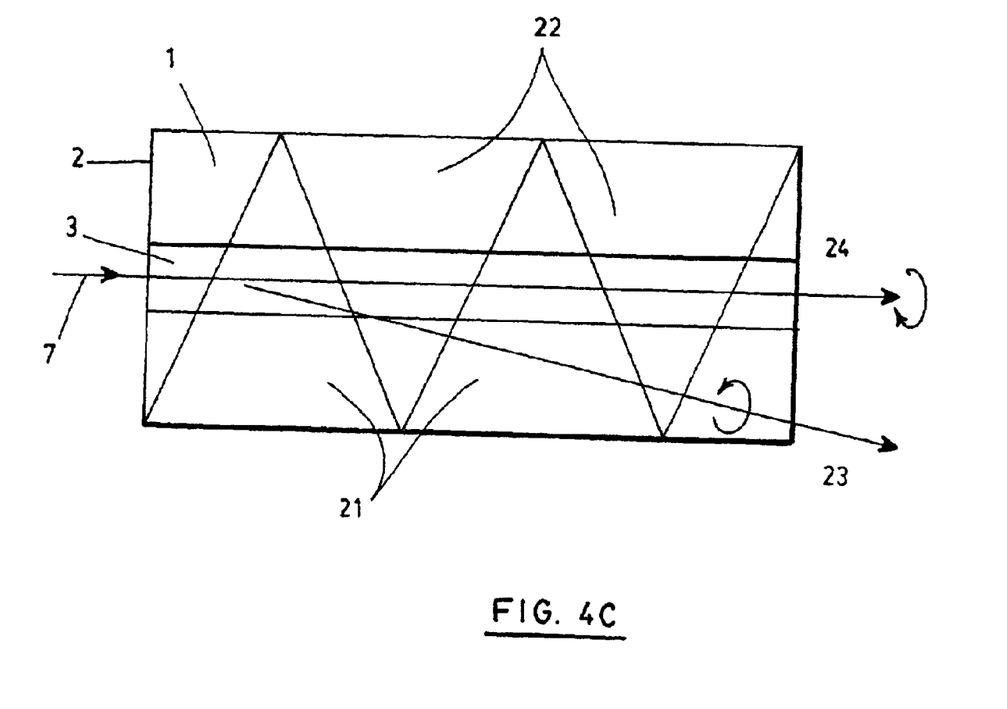
FIG. 4C is a cross-sectional view of a fibre according to another embodiment of the invention, where the pores have been alternately and periodically filled with dextrogyre and levogyre materials.

In the case of the material exhibiting optical activity, the material is preferably a chiral material. Such waveguides can be used to vary the state of polarisation of the light within the waveguide. In an alternative embodiment, the doping of the porous glass can be done alternatively, along the axis of the fibre, with "dextrogyre" and "levogyre" chiral substances, in order to produce polarisers, shown in FIG. 4C. This is the waveguide equivalent to a bulk Fresnel prismBy selecting the geometry of the fibre, it is possible to create a waveguide where only one polarisation state will be guided by the fibre.

The method of manufacture is the same as above, but the polymers are chosen according to their property of circular birefringence.

In the case of a chiral polymer, which creates circular birefringence, the core of the fibre can be made periodically porous. The pores are then filled with a dextrogyre polymer. The rest of the core is made porous, and the pores are then filled with a levogyre polymer. By properly controlling the acid chemical attack, an oblique interface can be created between the two polymers and a prism-type Fresnel polariser can be made.

Faraday Rotator

In another embodiment of the invention, an optical waveguide made from porous glass, where the inner pores of the glass have been filled with a material which exhibits Faraday effect and whose outside has been doped with a substance which is magnetized, is presented.

Such a waveguide is a Faraday rotator that enables the rotation of the polarization state of the light in the waveguide.

In order to facilitate the splicing of an optical fibre according the various embodiments of the present invention to standard telecommunications fibres, it is advantageous to dope the extremities of the fibre with a silica-based sol-gel, thereby filling the pores with silica.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. An optical waveguide made of porous glass, wherein at least a portion of the pores of the porous glass are filled with a material which affects the propagation of light within the waveguide said material exhibiting optical activity or a Faraday effect.

2. An optical waveguide according to claim 1, wherein said optical waveguide is an optical fibre.

3. An optical waveguide made of porous glass, wherein at least a portion of the pores of the porous glass are filled with a material which affects the propagation of light within the waveguide, wherein said material is an electro-optical material.

4. An optical waveguide according to claim 3, wherein said electro-optical material is a polymer.

5. An optical waveguide according to claim 4, wherein said polymer includes dextrogyre and levogyre polymers, axially alternately and periodically filling the pores of the waveguide.

6. An optical waveguide made of porous glass, wherein at least a portion of the pores of the porous glass are filled with a material which affects the propagation of light within the waveguide, wherein said optical waveguide has two opposite ends, the pores at the opposite ends being filled with silica.

7. An optical waveguide made of porous glass, wherein at least a portion of the pores of the porous glass are filled with a material which affects the propagation of light within the waveguide, wherein said optical waveguide further includes a Bragg grating.

8. An optical waveguide made of porous glass, wherein at least a portion of the pores of the porous glass are filled with a material which affects the propagation of light within the waveguide, wherein said material has an index of refraction substantially equal to the index of refraction of the porous glass.

9. An optical waveguide made of porous glass, wherein at least a portion of the pores of the porous glass are filled with a material which affects the propagation of light within the waveguide, wherein said material has an index of refraction which is different from the index of refraction of the porous glass.

10. An optical waveguide made of porous glass, wherein at least a portion of the pores of the porous glass are filled with a material which affects the propagation of light within the waveguide, wherein said waveguide has a symmetry which is not circular.

11. An optical waveguide made of porous glass, wherein at least a portion of the pores of the porous glass are filled with a material which affects the propagation of light within the waveguide, wherein said waveguide is single mode.

* * * * *